(12) United States Patent
Nakano (10) Patent No.: US 7,751,343 B2
(45) Date of Patent: Jul. 6, 2010

(54) DATA TRANSMISSION METHOD AND TERMINAL USED FOR DATA TRANSMISSION METHOD

(75) Inventor: Takashi Nakano, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 321 days.

(21) Appl. No.: 11/882,032

(22) Filed: Jul. 30, 2007

(65) Prior Publication Data

US 2007/0274325 A1 Nov. 29, 2007

Related U.S. Application Data

(63) Continuation of application No. PCT/JP2005/002033, filed on Feb. 10, 2005.

(51) Int. Cl.
*H04L 12/28* (2006.01)
*H04L 12/56* (2006.01)

(52) U.S. Cl. .............. 370/254; 370/390; 709/238

(58) Field of Classification Search .......... None
See application file for complete search history.

(56) References Cited

U.S. PATENT DOCUMENTS

| | | | |
|---|---|---|---|
| 7,573,835 B2 * | 8/2009 | Sahinoglu et al. | 370/255 |
| 2002/0085506 A1 * | 7/2002 | Hundscheidt et al. | 370/254 |
| 2004/0190514 A1 * | 9/2004 | Uchiyama et al. | 370/390 |
| 2006/0153099 A1 * | 7/2006 | Feldman et al. | 370/254 |
| 2006/0168104 A1 * | 7/2006 | Shimizu et al. | 709/218 |

FOREIGN PATENT DOCUMENTS

| | | |
|---|---|---|
| JP | 06-244806 | 9/1994 |
| JP | 07-245612 | 9/1995 |
| JP | 2003-008642 | 1/2003 |
| JP | 2004-297521 | 10/2004 |

OTHER PUBLICATIONS

Japanese Office Action issued Apr. 28, 2009 in corresponding Japanese Patent Application 2007-502520.
International Search Report; PCT/JP2005/002033 dated May 17, 2005 w/Written Opinion of the International Searching Authority.
RelayCast: Middleware for Peer-to-Peer Streaming Distribution by Nodoka Mimura et al., School of Engineering, The University of Tokyo w/Eng. Abstract, 2002.
Multi-path Routing Algorithm for Peer-to-Peer Multicast by Kiyohide Nakauchi et al., School of Engineering, The University of Tokyo w/Eng. Abstract, 2001.
Partial Translation of the Written Opinion; PCT/: PCT/ISA , dated May 17, 2005.

* cited by examiner

*Primary Examiner*—Hong Cho
*Assistant Examiner*—Robert C Scheibel
(74) *Attorney, Agent, or Firm*—Fujitsu Patent Center

(57) ABSTRACT

The present invention discloses a data transmission method for transmitting real-time data from a server to plural terminals via a network having plural local area networks connected to a wide area network. The method includes the steps of grouping plural terminals connected to a same switching hub into a single terminal group, generating a table indicating a rank and an address of each terminal in the terminal group, and transferring the real-time data from a first terminal to a second terminal that is one rank lower than the first terminal in accordance with the ranks indicated in the table.

7 Claims, 9 Drawing Sheets

| RANK | MAC ADDRESS | IP ADDRESS |
|---|---|---|
| 1 | bbbb | BBBB |
| 2 | aaaa | AAAA |
| 3 | cccc | CCCC |
| 4 | dddd | DDDD |
| ⋮ | ⋮ | ⋮ |

DATA TRANSMISSION METHOD AND TERMINAL USED FOR DATA TRANSMISSION METHOD

CROSS-REFERENCE TO RELATED APPLICATIONS

This application is a U.S. continuation application filed under 35 USC 111(a) claiming benefit under 35 USC 120 and 365(c) of PCT application JP 2005/002033, filed Feb. 10, 2005. The foregoing application is hereby incorporated herein by reference.

BACKGROUND OF THE INVENTION

1. Field of the Invention

The present invention relates to a data transmission method and a terminal used for the data transmission method, and more particularly, a data transmission method and a terminal used for transmitting data from a server to plural terminals via a network.

2. Description of the Related Art

In communicating in a conventional network using, for example, Ethernet (Registered Trademark), a server transmits data requested by a terminal in a given network in response to a transmission request from the terminal. In a case where plural terminals exist in a given network, resources such as communication paths are shared by the terminals. For example, the resources may be shared according to time division so that the terminal can communicate without obstructing one another.

The bandwidth of the network is calculated and determined according to the amount of data exchanged over the network. Furthermore, as for the types of exchanged data, a large part of the data is typically relatively small size data such as data containing documents and still images. Accordingly, the network is configured to match these communication conditions.

However, in recent years and continuing, performance of terminals is becoming significantly higher and more large size data such as real time image data and audio data are being exchanged. Such improvements can be used for transmitting real time image data/audio data in a network having plural LANs (Local Area Network) connected by a WAN (Wide Area Network). As one example, a company having branches in plural remote areas can transmit data (image data/audio data) containing a salutation of the company's president throughout the terminals of each branch in real time.

A technology for providing an efficient network is desired so that terminals in the network can receive large size real time data without experiencing service shutdown or serious delay.

Figure 1:
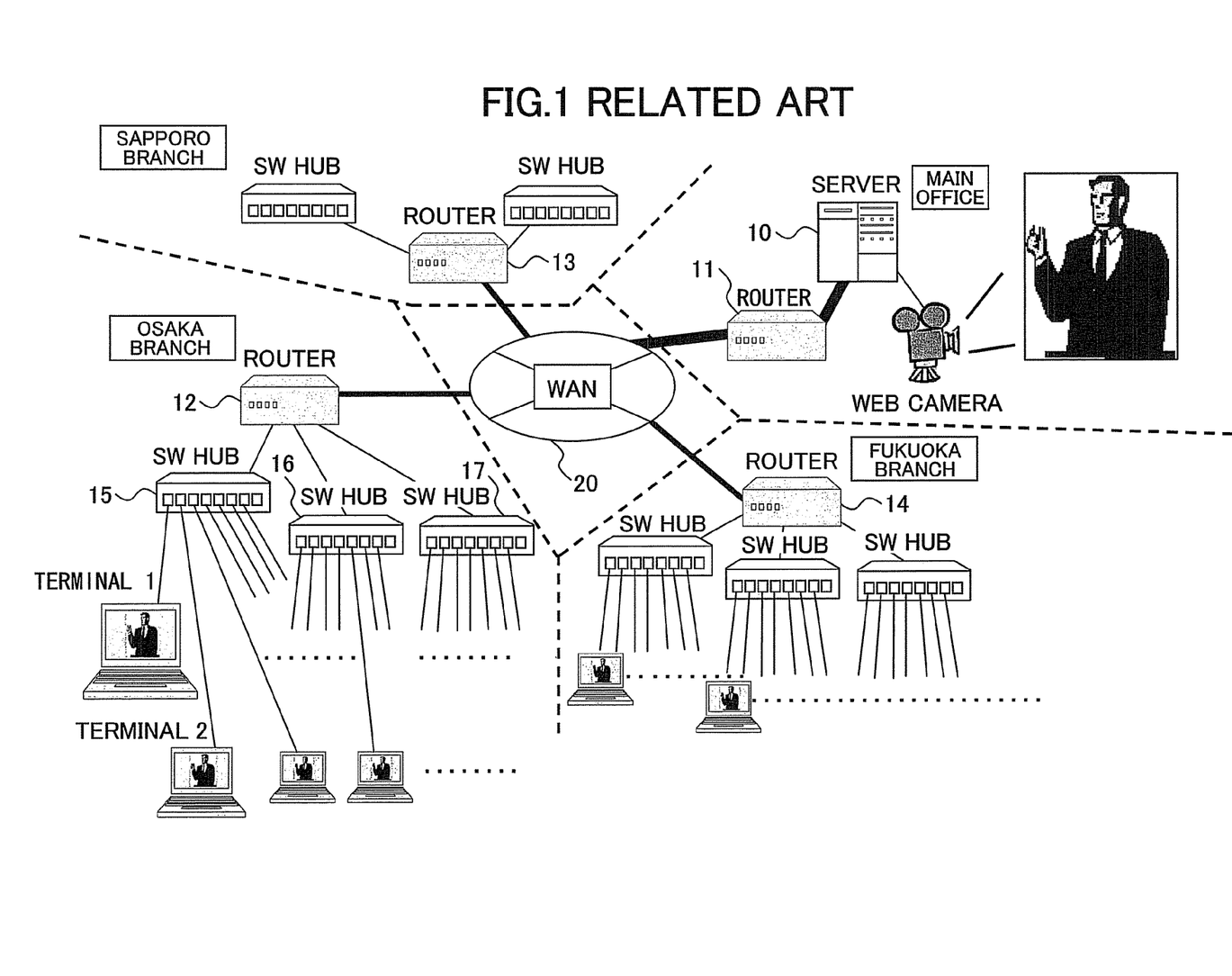
FIG. 1 is a schematic diagram showing an exemplary configuration for describing a conventional client/server type data broadcasting method.

FIG. 1 is a schematic diagram showing an exemplary configuration for describing a conventional client/server type data broadcasting method. In FIG. 1, a router 11 of a LAN of a main office is connected to a server 10 and a WAN 20. The WAN 20 is also connected to a router 12 of the Osaka branch, a router 13 of the Sapporo branch, and a router 14 of the Fukuoka branch.

For example, the LAN of the Osaka branch is configured having the router 12 connected to switching hubs 15, 16, and 17. Each switching hub 15-17 is connected to plural terminals. The LANs of the main office and other branches are also configured in the same manner.

In typical client/server communications, a terminal (client) of each branch sends a request for data transmission by transmitting packets indicating the desire for data transmission to the server 10 assuming the position of transmitting the data.

The server 10, upon receiving the data transmission request, begins to transmit the data to each terminal.

Figure 2:
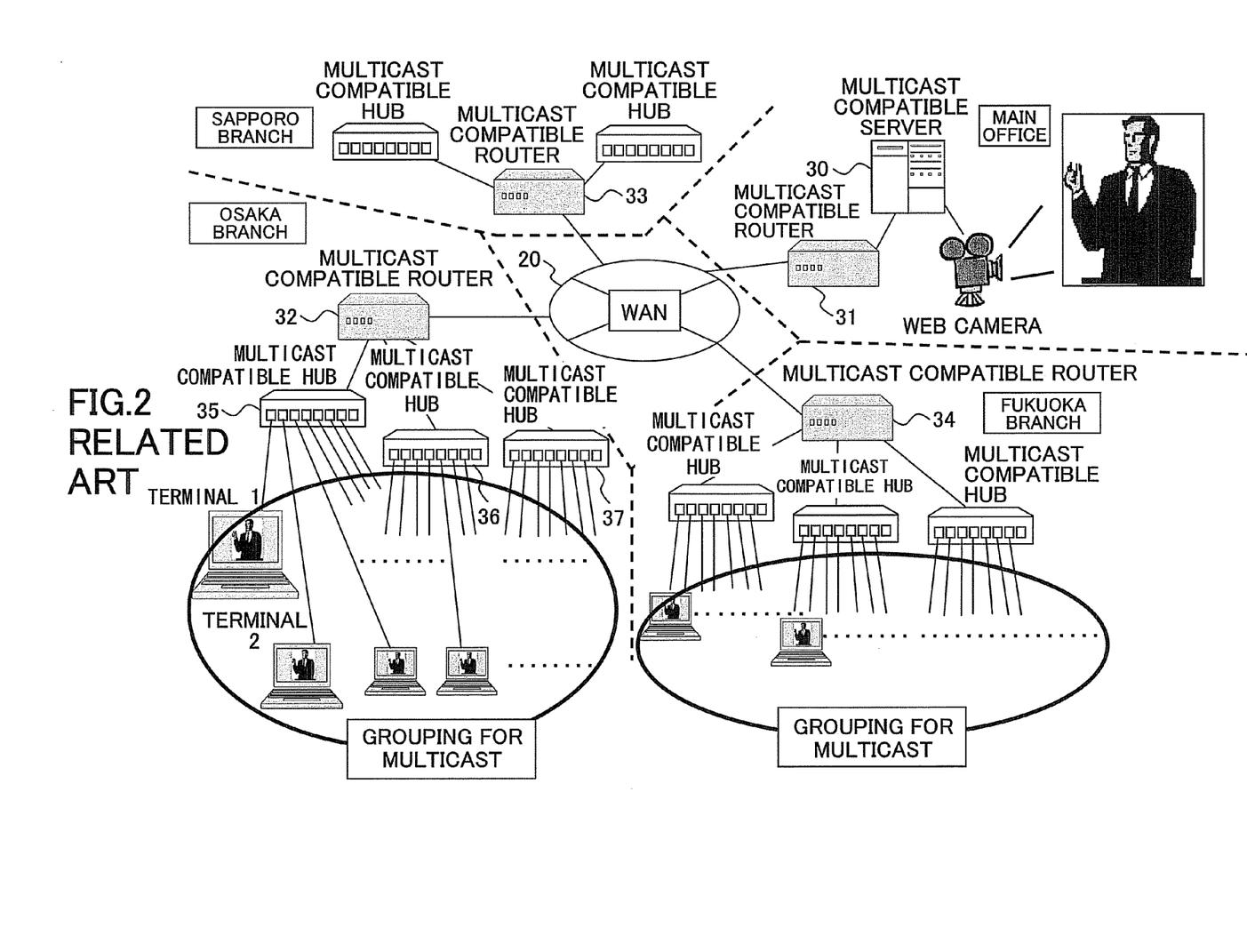
FIG. 2 is a schematic diagram showing a network configuration for describing a conventional data transmission method using IP multicast.

FIG. 2 is a schematic diagram showing a network configuration for describing a conventional data transmission method using IP multicast. In FIG. 2, a router 31 of a LAN of a main office is connected to a server 30 and a WAN 20. The WAN 20 is also connected to a router 32 of the Osaka branch, a router 33 of the Sapporo branch, and a router 34 of the Fukuoka branch.

For example, the LAN of the Osaka branch is configured having the router 32 connected to switching hubs 35, 36, and 37. Each switching hub 35-37 is connected to plural terminals. The LANs of the main office and other branches are also configured in the same manner.

In using IP multicast technology, a destination IP address is designated as a multicast address upon transmitting data from the server 30 to plural specific terminals. A Class D address is used as the multicast address. One multicast address represents a single host group (a group comprising plural terminals). For example, in the Osaka branch shown in FIG. 2, all the terminals connected to the switching hubs 35, 36, 37 form a single host group.

Multicast packets are basically transmitted to every host in the network. Each host (recipient host) receiving the multicast packets determines whether it (recipient host) is included in a host group(s) designated by the multicast packets and selects packets corresponding to the recipient host.

Figure 3:
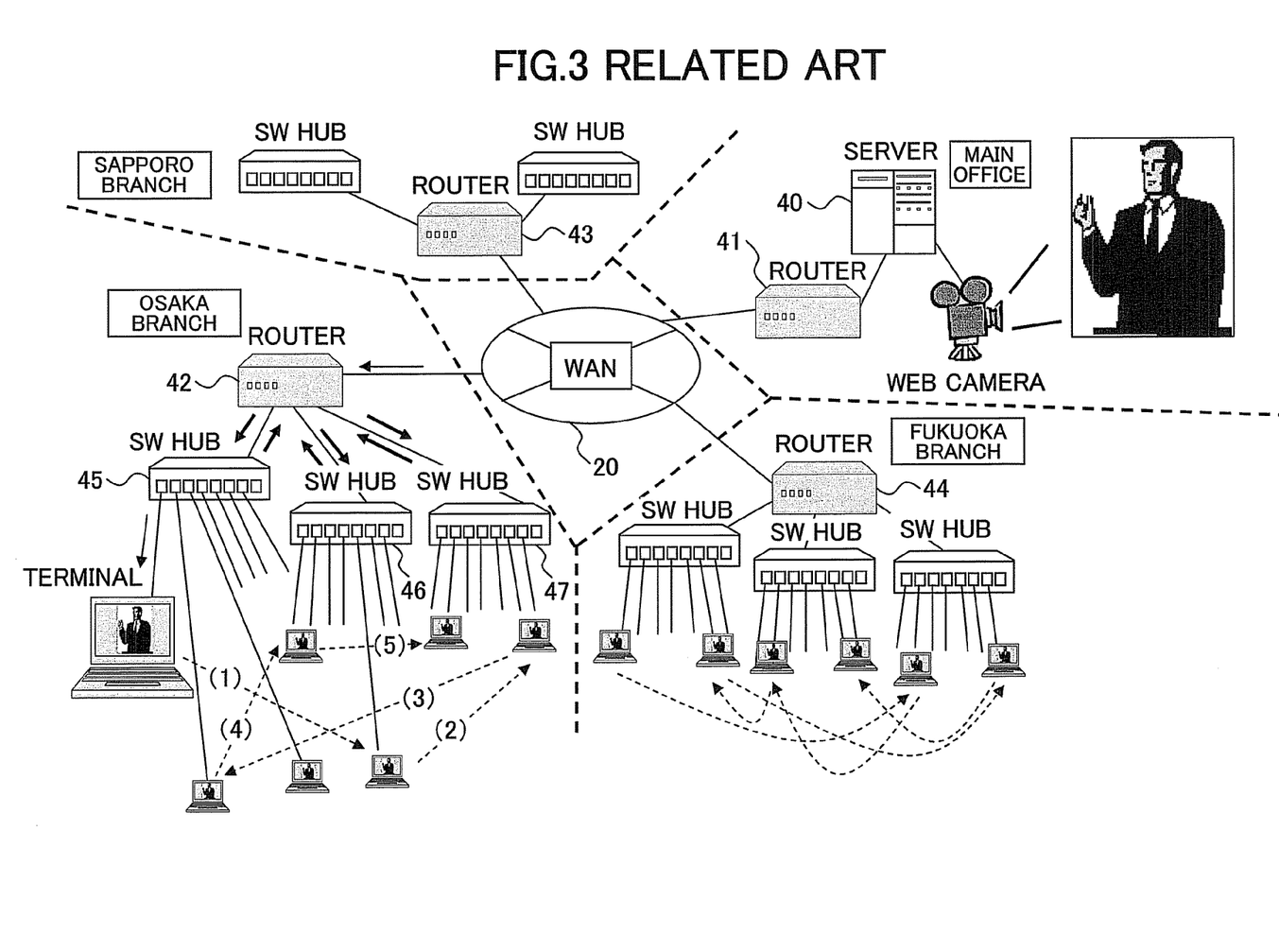
FIG. 3 is a schematic diagram showing a network configuration for describing a conventional peer-to-peer type data transmission method.

FIG. 3 is a schematic diagram showing a network configuration for describing a conventional peer-to-peer type data transmission method. In FIG. 3, a router 41 of a LAN of a main office is connected to a server 40 and a WAN 20. The WAN 20 is also connected to a router 42 of the Osaka branch, a router 43 of the Sapporo branch, and a router 44 of the Fukuoka branch.

For example, the LAN of the Osaka branch is configured having the router 42 connected to switching hubs 45, 46, and 47. Each switching hub 45-47 is connected to plural terminals. The LANs of the main office and other branches are also configured in the same manner.

In using a simple peer-to-peer technology as shown in FIG. 3, regardless of the physical arrangement of the LANs, packets are transferred among terminals grouped in predetermined units (e.g., segments) in an order beginning from the terminal which first receives the packets, as indicated with broken line arrows (1)-(5).

As a method of realizing multicast communications, Japanese Laid-Open Patent Application No. 2003-8642 teaches a technology where each terminal performs carrier sensing after a predetermined delay time.

Furthermore, Japanese Laid-Open Patent Application No. 6-244806 teaches a technology that identifies which slave terminal has malfunctioned by referring to an echo-back status of data flowing in a communication path connecting a host terminal to plural slave terminals.

When transmitting real time data such as image data and audio data to each terminal by using the conventional client/server type data, the transmission data easily exceed available bandwidth of the network due to the large size of the transmission data. This causes various problems to occur (e.g., shut down of service, serious delay, frequent discontinuation of real time data) and prevents satisfactory communication.

Although there is a method of solving such problems by increasing the bandwidth of the channels in the LAN or channels of the WAN, such an increase leads to an increase of cost. It is unsuitable to make such an investment in a case where real time technology is used only a few times a year, such as the above-described case of broadcasting a salutation of the company's president in real time. Furthermore, even in a case where real time data communications are not conducted frequently, there are cases where it is important to transmit the data in real time. Therefore, it is desired to prevent a large increase of cost.

Furthermore, although it may be beneficial to transmit data by using broadcast packets in a case where the data are to be used by every terminal, the transmission of data using broadcast packets can cause a serious drop of communications efficiency for a terminal not requiring the transmitted data.

Furthermore, since multicast packets are transmitted to host groups in a case of conducting data transmission by using conventional IP multicast technology, each resource (e.g., the routers 31-34, the server 30, the terminals, and software thereof in FIG. 2) is to be compatible to the multicast technology. Accordingly, in building the infrastructure of the network, facilities/apparatuses not compatible with multicast technology are to be replaced with those compatible with multicast technology. Therefore, it is unsuitable to make such an investment in a case where real time technology is used only a few times a year, such as the above-described case of broadcasting a salutation of the company's president in real time.

Furthermore, it may be possible to reduce access to the channels of the most commonly shared WAN 20 by preparing a streaming server in the LANs of each branch for temporarily storing image/audio data transmitted from the main office and relaying the stored data, so that each terminal of each branch can access the streaming server. However, in a case where there is a large number of client terminals, data cannot be satisfactorily transmitted when the amount of transmission data [(image data+audio data)×number of client terminals] exceeds the bandwidth provided in the LANs.

In the conventional peer-to-peer type data transmission method, it may be possible to prevent packets from concentrating at the connecting points between the routers 11-14 and the WAN 20 as shown in FIG. 1, for example. However, in a case of receiving real time data for a long period, the amount of data flowing in the network parts shared between the switching hubs and the routers may increase as transfer of data is repeated.

SUMMARY OF THE INVENTION

The present invention may provide a data transmission method and a terminal used for the data transmission method that substantially obviates one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by a data transmission method and a terminal used for the data transmission method particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides a data transmission method for transmitting real-time data from a server to a plurality of terminals via a network having a plurality of local area networks connected to a wide area network, the method including the steps of: grouping a plurality of terminals connected to a same switching hub into a single terminal group; generating a table indicating a rank and an address of each terminal in the terminal group; transmitting the real-time data from the server to a first terminal having the highest rank according to the ranks indicated in the table; and transferring the real-time data from the first terminal to a terminal that is one rank lower than the first terminal according to the ranks indicated in the table.

Furthermore, another embodiment of the present invention provides a terminal used for a data transmission method for transmitting real-time data from a server to a plurality of terminals via a network having a plurality of local area networks connected to a wide area network, the terminal including: a table indicating a rank and an address of each terminal of a single terminal group, the terminal group including a plurality of terminals connected to a same switching hub; a reception part for receiving the real-time data from the switching hub or another terminal that is one rank higher than the terminal according to the ranks indicated in the table; and a transfer part for transferring the real-time data to another terminal that is one rank lower than the terminal according to the ranks indicated in the table.

Other objects and further features of the present invention will be apparent from the following detailed description when read in conjunction with the accompanying drawings.

DESCRIPTION OF THE PREFERRED EMBODIMENTS

In the following, embodiments of the present invention will be described with reference to the accompanying drawings.

[Network Configuration]

Figure 4:
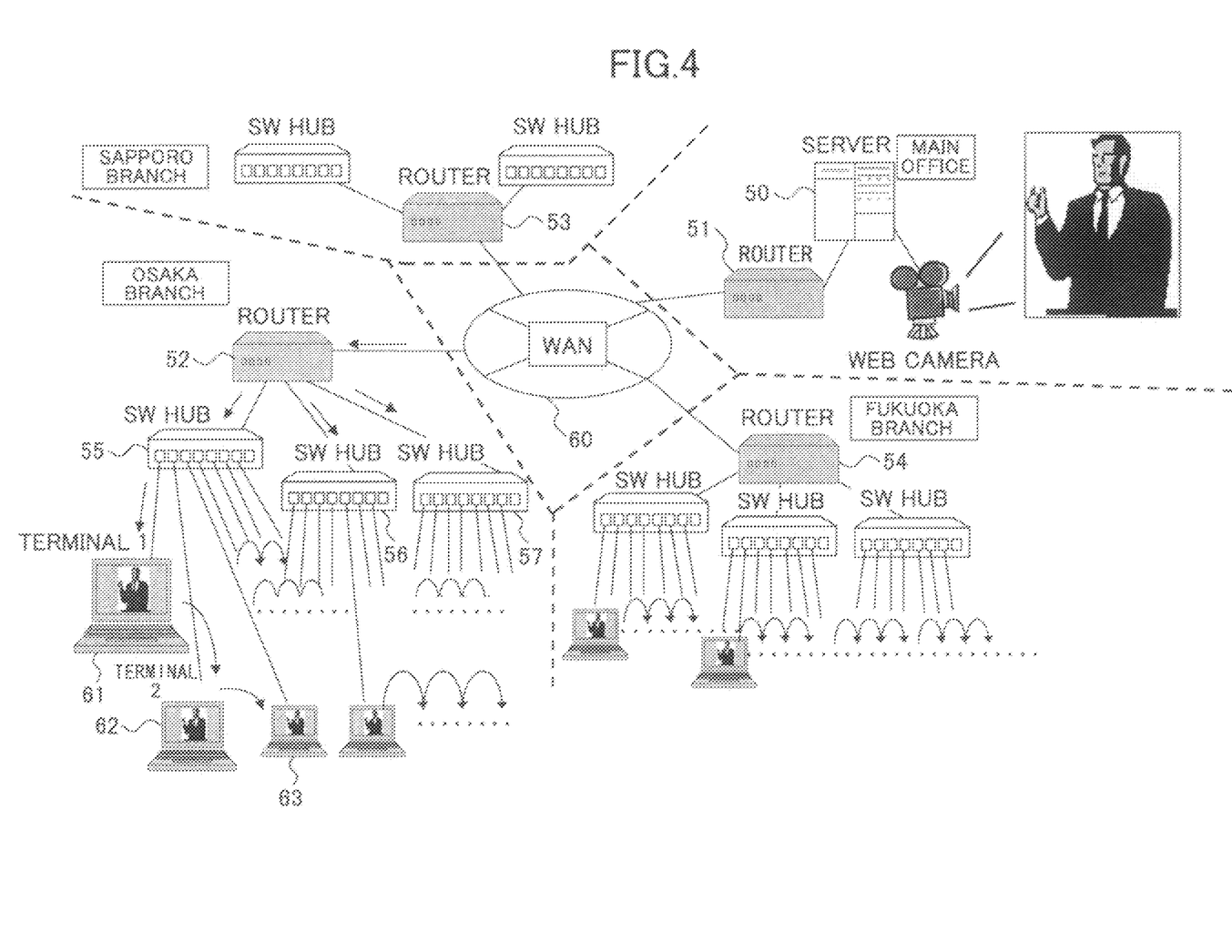
FIG. 4 is a schematic diagram showing a network configuration for describing a data transmission method according to an embodiment of the present invention.

FIG. 4 is a schematic diagram showing a network configuration for describing a data transmission method according to an embodiment of the present invention. In FIG. 4, a router 51 of a LAN of a main office is connected to a server 50 and a WAN 60. The WAN 60 is also connected to a router 52 of the Osaka branch, a router 53 of the Sapporo branch, and a router 54 of the Fukuoka branch.

For example, the LAN of the Osaka branch is configured having the router 52 connected to switching hubs 55, 56, and 57. Each switching hub 55-57 has a cascade port connected to plural terminals. The LANs of the main office and other branches are also configured in the same manner.

In each branch, plural terminals connected to each switching hub (e.g., switching hubs 55-57 of Osaka branch) form a group (terminal group). The order (rank order) in which a terminal receives image data/audio data (real-time data) is determined beforehand for every terminal in each terminal group. Each terminal has a terminal group address table (see, for example, FIG. 5) indicating the predetermined order (rank order), the MAC addresses, and the IP addresses of the terminals belonging to its corresponding terminal group.

Figure 5:
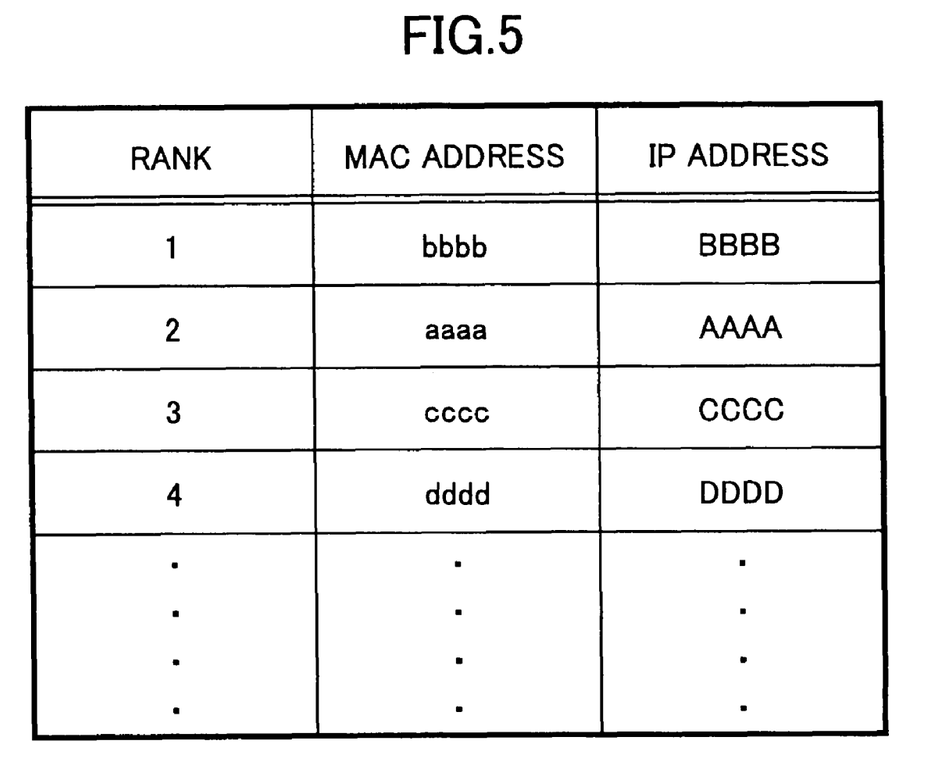
FIG. 5 shows a terminal group address table according to an embodiment of the present invention.

For example, FIG. 5 shows a terminal group address table of the terminals 61-63, . . . connected to a switching hub 55 of the Osaka branch. In the row corresponding to order-rank 1, a MAC address (bbbb) and an IP address (BBBB) corresponding to the terminal 62 are registered. In the row corresponding to order-rank 2, a MAC address (aaaa) and an IP address (AAAA) corresponding to the terminal 61 are registered. The table may be stored in the switching hub, wherein the table is generated in response to a request from each terminal.

Each terminal requests another terminal having a predetermined rank to transfer real-time data at predetermined periods (cycles) based on the terminal group address table. In this example, a terminal makes the transfer request to another terminal that is one rank higher than itself.

As for the method of generating (setting) the terminal group address tables for each of the terminals, it may be conducted by allowing a system administrator to generate (set) terminal group address tables terminal-by-terminal. Another method is registering (storing) terminal group address tables corresponding to switching hubs of each branch in a database of an existing server connected to a LAN or a WAN beforehand (pre-registration) and setting a corresponding registered group address table upon request from a terminal. Another method is registering (storing) a terminal group address table for each switching hub and generating (setting) a corresponding registered group address table upon request from a terminal. Another method is allowing each terminal to generate (set) a corresponding group address table by using a rank defining process (described below).

Figure 6:
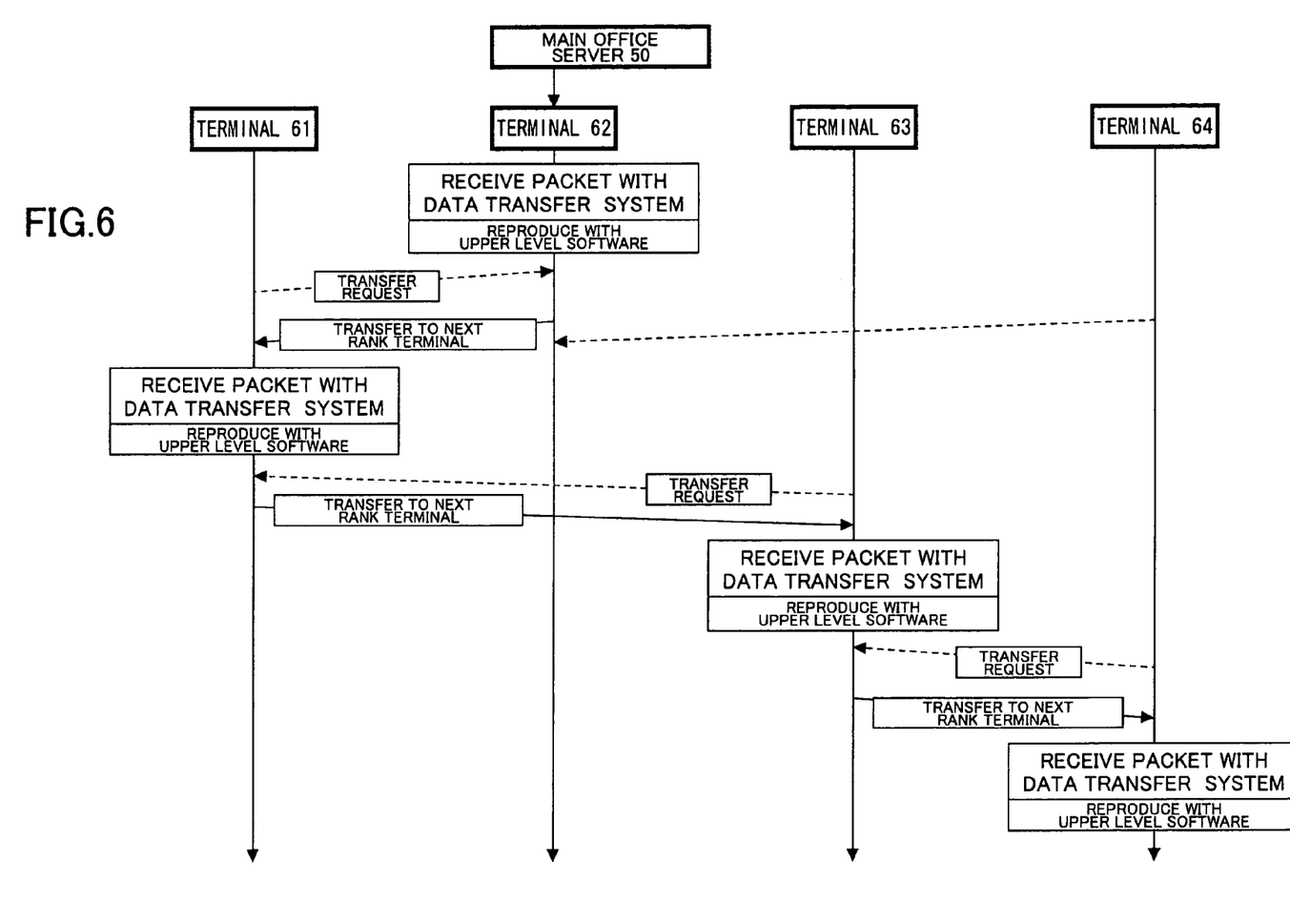
FIG. 6 is an exemplary operation sequence diagram of a data transmission method according to an embodiment of the present invention.

FIG. 6 is an exemplary operation sequence diagram of a data transmission method according to an embodiment of the present invention. In this example, data are transmitted in a terminal group comprising terminals 61-64 each connected to a cascade port of the switching hub 55 of the Osaka branch. In this example, each terminal 61-64 has a data transfer system which is activated for requesting another terminal that is one rank higher than itself to transfer image data/audio data (real-time data) at a predetermined cycle based on the terminal group address table. Although four terminals are used to describe this operation sequence for the sake of convenience, the number of the terminals may be greater than or less than four.

In FIG. 6, real-time data transmitted from the server 50 of the main office are transmitted to the routers 52-54 of the branches via the WAN 60. The routers 52-54 of the branches transmit the real-time data to a predetermined terminal in a terminal group of the switching hubs (switching hubs 55-57 in Osaka Branch) connected to the routers 52-54. More specifically, the real-time data are transmitted to a predetermined terminal having the highest rank among the terminals of a terminal group which predetermined terminal has activated its data transfer system and requested transfer of the real-time data to the server 50.

In one example, first, a terminal 62 having the highest rank among the terminals of a terminal group receives the real-time data from the server 50 via the switching hub 55. The terminal 62 buffers the received real-time data and reproduces the received real-time data with upper level software. Subsequently, when the terminal 62 receives a data transfer request from a terminal 61 one rank lower than itself (terminal 62), the terminal 62 transfers the buffered real-time data to the terminal 61 that has requested data transfer in the terminal group.

Then, the terminal 61 buffers the received real-time data and reproduces the received real-time data with upper level software. Subsequently, when the terminal 61 receives a data transfer request from a terminal 63 one rank lower than itself (terminal 61), the terminal 61 transfers the buffered real-time data to the terminal 63 that has requested data transfer in the terminal group.

Likewise, the terminal 63 buffers the received real-time data and reproduces the received real-time data. Subsequently, when the terminal 63 receives a data transfer request from a terminal 64 one rank lower than itself (terminal 63), the terminal 63 transfers the buffered real-time data to the terminal 64 that has requested data transfer in the terminal group. Then, the terminal 64 buffers the received real-time data and reproduces the received real-time data.

Accordingly, real-time data can be transmitted without having all the terminals in a terminal group accessing the server 50 and without causing data traffic concentrating at shared parts of the network.

Even in a case where a switching hub conducts the above-described transfer operation, this transfer operation does not affect communications with other switching hubs connected to the switching hub or communications of non-transfer ports of the switching hub. This is due to the fact that traffic in one port of the switching hub is physically independent from traffic in the other ports. Here, "non-transfer port" refers to an unused port or a port connected to a terminal not using a data transfer system. Since packets of real-time data are transferred by relaying the packets from one terminal to another, a delay is caused each time the packets are transferred to another terminal. Accordingly, the delay time increases in proportion with the number of times the packets are transferred to another terminal. Nevertheless, since the number of ports of a typical switching hub is 20 at most, the delay time created for the packets to reach the last terminal has little effect in transmitting real-time data.

With the data transmission method according to an embodiment of the present invention, each terminal belonging to a terminal group connected to a switching hub reproduces real-time data for itself while at the same time sequentially transfers the real-time data to other terminals within the terminal group. Thereby, large size data such as image data and audio data can be provided to all the terminals which desire the data without increasing the data traffic burden.

Hence, large size data requested by plural terminals can be reproduced without increasing traffic by effectively using existing resources such as routers and switching hubs that are not compatible with multicast. Thereby, the network can be used efficiently.

[Function of Terminal]

Figure 7:
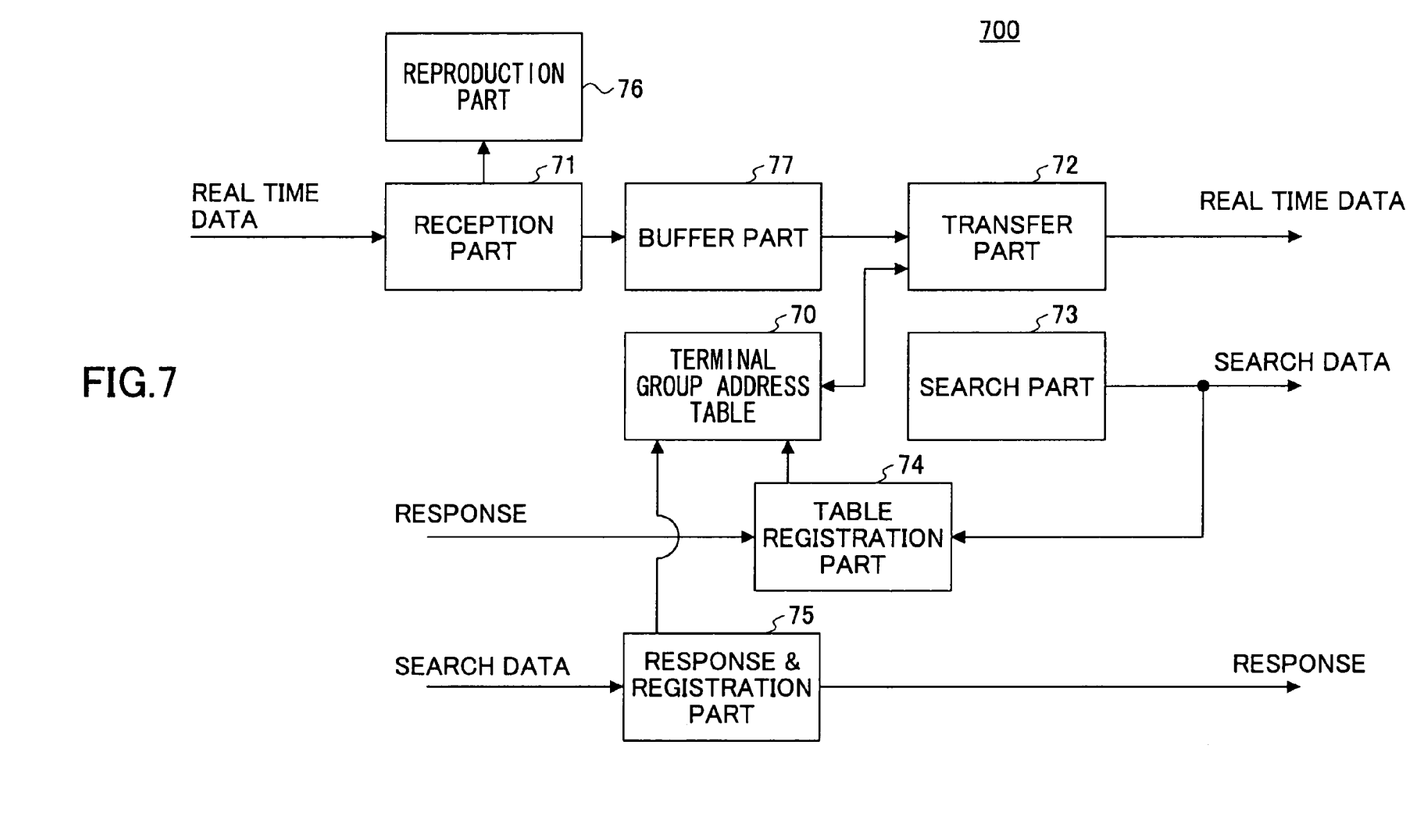
FIG. 7 is a schematic diagram for describing the functions of a terminal to which a data transmission method according to an embodiment of the present invention is applied.

FIG. 7 is a schematic diagram for describing the functions of a terminal 700 to which a data transmission method according to an embodiment of the present invention is applied. The terminal 700 shown in FIG. 7 includes a terminal group address table 70 to which an order-rank and an address of each terminal belonging to a terminal group of the same switching hub are registered.

A reception part 71 is for receiving real-time data transmitted from a server via a corresponding switching hub or a terminal having a rank higher than itself (terminal 700) and writing the real-time data to a buffer part 77.

A transfer part 72 is for transferring real-time data read out from the buffer part 77 to a terminal one rank lower than itself (terminal 700) according to the terminal group address table 70.

A search part 73 is for transmitting search data (search packets) to other terminals connected to the same switching hub as itself (terminal 700) upon activation.

In a case where there is no reply from the other terminals in response to the transmitted search data, a table registration part 74 registers itself as the highest rank (rank #1) in the terminal group table 70 together with its own address (address of terminal 700). In a case where there is a reply from the other terminals in response to the transmitted search data, the table registration part 74, based on table data included in the reply from the other terminals, registers itself one rank lower than the lowest ranked terminal in the terminal group table 70 together with its own address.

A reply & registration part (also referred to as "reply/registration part") 75 generates a reply including table data indicating the content of the terminal group address table 70 when receiving search data from another terminal, transmits the reply to the origin (original terminal) that transmitted the search data, and registers the original terminal as one rank lower than the lowest ranked terminal in the terminal group address table 70 together with the address of the original terminal.

A reproduction part 76 is for reproducing real-time data received in the reception part 71.

[Rank Defining Process]

Figure 8:
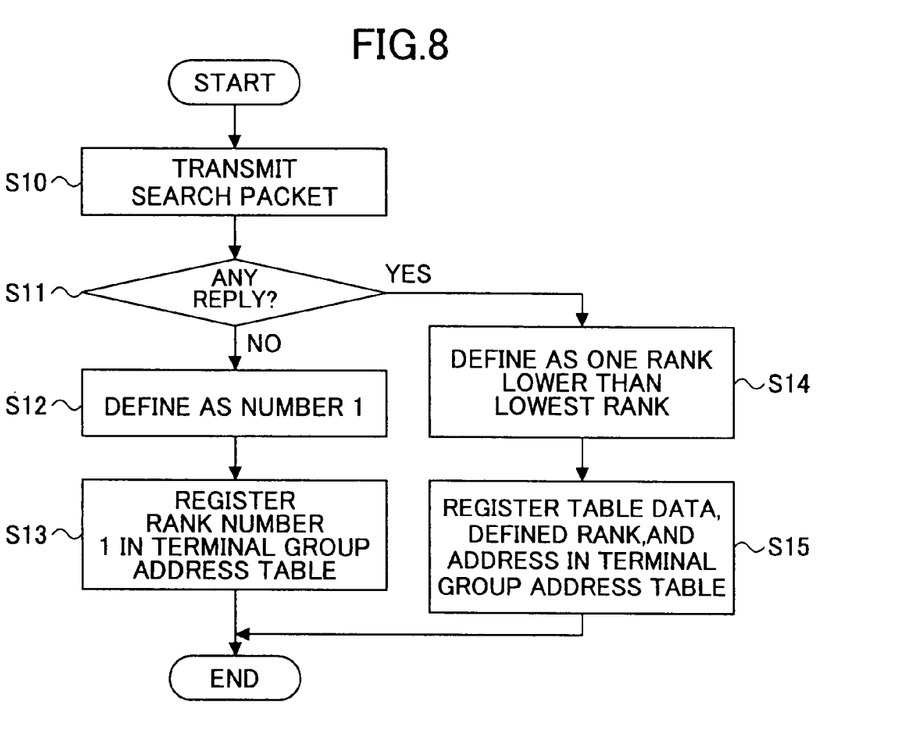
FIG. 8 is a flowchart showing a rank defining process conducted by a terminal upon activation of its data transfer system according to an embodiment of the present invention.

FIG. 8 is a flowchart showing a rank defining process conducted by a terminal (e.g., terminal 700) upon activation of its data transfer system according to an embodiment of the present invention.

In FIG. 8, when a data transfer system of terminal 700 is activated, the terminal 700 transmits a search packet (search data) including a MAC address and an IP address of itself to a switching hub connected to the terminal 700 (Step S10). Then, by using a broadcast transmission method, the switching hub transmits the received search packet to all terminals connected to its cascade port except for the port receiving the search packet.

Then, the terminal 700 determines whether there is a reply from other terminals within a predetermined period in response to the transmitted search packet (Step S11). The predetermined period is a time sufficient for the terminal 700 to receive replies from other terminals belonging to the same terminal group as the terminal 700. Therefore, even in a case where the search packet is transmitted to terminals belonging to a terminal group different from the terminal group of the terminal 700 via a common part of a switching hub and a router(s), no reply will be received from the terminals of the different terminal group during the predetermined period. Therefore, a terminal belonging to the different terminal group will not be mistaken as a terminal belonging to the same terminal group as the terminal 700.

In a case where there is no reply from the other terminals and no other terminal having an activated data transfer system, the terminal 700 defines its rank as number one (Step S12) and registers its rank (#1) and its MAC address and IP address in its terminal group address table 70 (Step S13). It is to be noted that the group address table 70 in the terminal 700 is cleared upon activation of its data transfer system.

Meanwhile, in a case where there is a reply from the other terminals, the terminal 700 identifies the lowest rank from group address table data included in the reply and defines its rank as being one rank lower than the identified lowest rank (Step S14).

Then, the terminal 700 registers the group address table data included in the reply, its rank, MAC address, and IP address in its terminal group address table 70 (Step S15).

It is to be noted that the content of the terminal group address data included in each reply is the same even in a case where the terminal 700 receives plural replies from the other terminals. Therefore, the terminal 700 defines its rank based on the first received reply and registers the rank in its terminal group address table 70.

Figure 9:
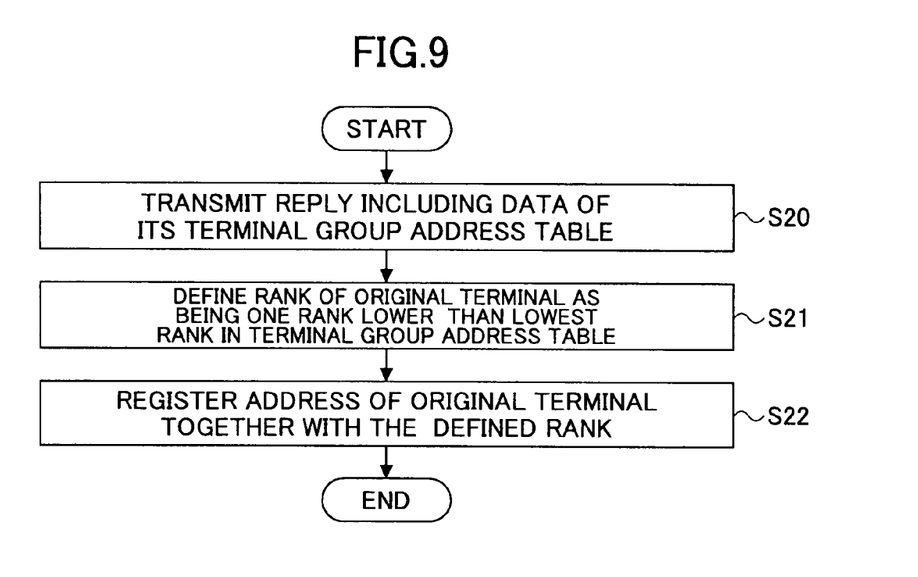
FIG. 9 is a flowchart showing a rank defining process conducted by a terminal upon responding to search data according to an embodiment of the present invention.

FIG. 9 is a flowchart showing a rank defining process conducted by a terminal (e.g., terminal 700) upon responding to search data according to an embodiment of the present invention.

In FIG. 9, when the terminal 700 receives a search packet transmitted from another terminal (original terminal), the terminal 700 generates a reply including terminal group address table data containing a duplicate (copy) of the content of the terminal group address table 70 of the terminal 700 and transmits the generated reply to the original terminal (Step S20). The MAC address and the IP address of the terminal 700 are also included in the reply.

Then, the terminal 700 identifies the lowest rank from its terminal group address table 70 and defines the rank of the original terminal as being one rank lower than the identified lowest rank (Step S21).

Then, the terminal 700 registers the defined rank, the MAC address, and the IP address of the original terminal in the terminal group address table 70 (Step S22).

Figure 10:
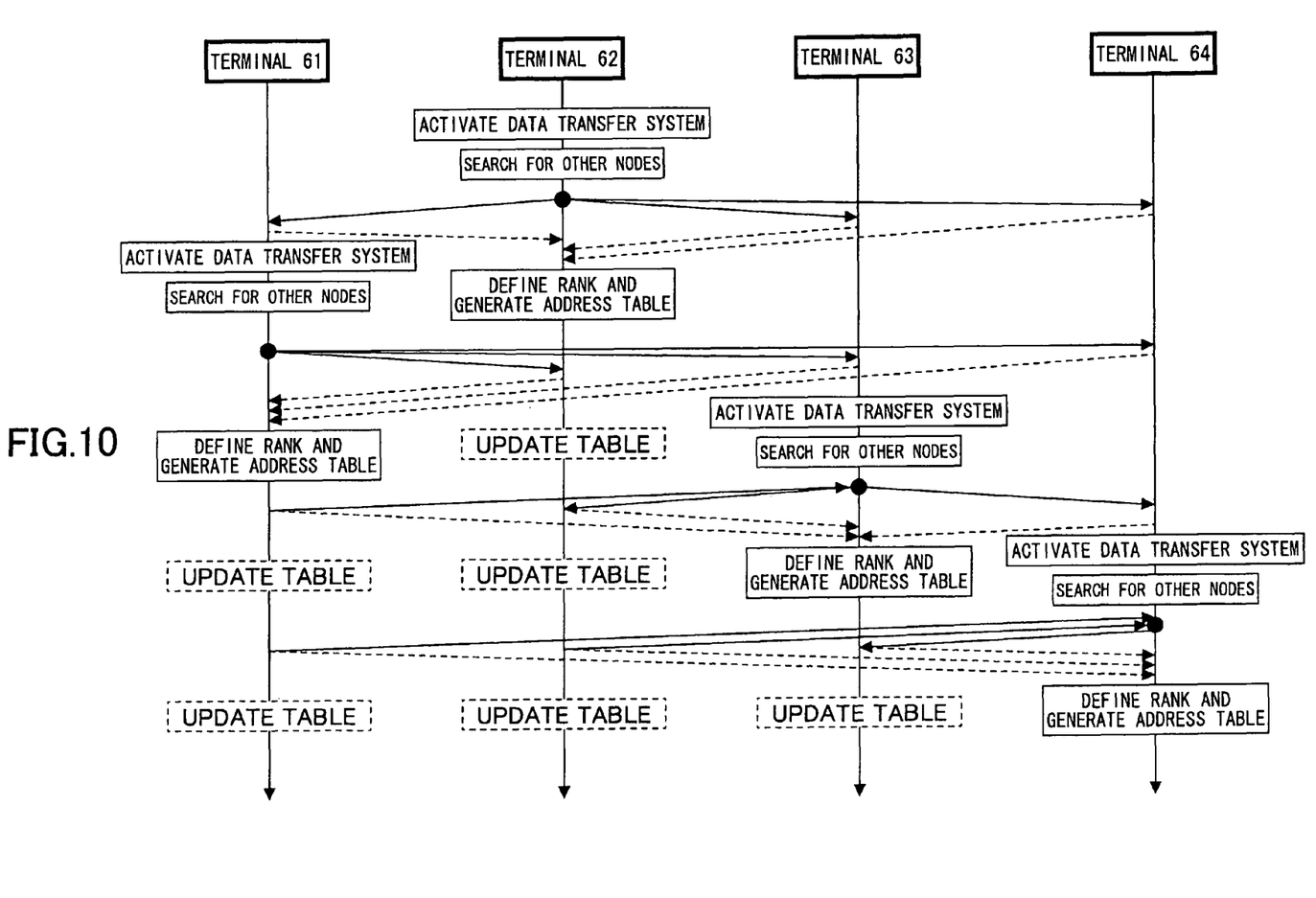
FIG. 10 is a sequence diagram showing an exemplary operation of defining a rank in a terminal group according to an embodiment of the present invention.

FIG. 10 is a sequence diagram showing an exemplary operation of defining a rank in a terminal group according to an embodiment of the present invention. This operation is described by using an example of defining the ranks of a terminal group comprising terminals 61-64 connected to respective ports (cascade port) of a switching hub 55 of the Osaka branch. Although four terminals are used to describe this operation for the sake of convenience, the number of the terminals may be greater than or less than four. Furthermore, software of a data transfer system configured to execute the processes shown in FIGS. 8 and 9 is already installed in the terminals 61-64 beforehand.

Among the plural terminals 61-64 having the data transfer system built therein, the terminal 62 having the earliest activated data transfer system transmits a search packet for determining whether there is a terminal already having an activated (active) data transfer system among the terminals connected to the switching hub 55 (search for other nodes).

Then, in a case where there is no reply from the data transfer systems of the other terminals of the terminal group connected to the switching hub 55 in response to the search packet transmitted from the terminal 62, that is, in a case where there is no other terminal having an activated data transfer system, the terminal 62 defines its rank as having the highest rank (number one) among the data transfer systems along with generating a terminal group address table and registering its rank, the MAC address, and the IP address in the terminal group address table.

Then, a terminal 61, having its data transfer system activated, begins to search (transmission of search packet) for other nodes. Then, the terminal 62 transmits a reply to the terminal 61 in response to the search data. The terminal 61 receiving the reply from the terminal 62 defines its own rank as number two and registers the rank of terminal 62 and its rank (rank of terminal 61), MAC address, and IP address in its terminal group address table.

Further, the terminal 62 receiving the search packet from the terminal 61 updates its terminal group address table by adding the rank (number two), the MAC address, and the IP address of the terminal 61 to its terminal group address table.

Then, a terminal 63, having its data transfer system activated, begins to search (transmission of search packet) for other nodes. Then, the terminals 61, 62 transmit a reply to the terminal 63 in response to the search packet. The terminal 63 receiving the reply from the terminals 61, 62 defines its rank as number three and registers the ranks of terminals 61, 62 and its rank (rank of terminal 63), MAC address, and IP address in its terminal group address table.

Further, the terminals 61, 62 receiving the search packet from the terminal 63 update their terminal group address table by adding the rank (number three), the MAC address, and the IP address of the terminal 63 to their terminal group address tables.

Then, a terminal 64, having its data transfer system activated, begins to search (transmission of search packet) for other nodes. After finding other nodes, the terminal 64 registers the ranks, the MAC addresses, and the IP addresses of itself and the other nodes. Further, the terminals 61-63 receiving the search packet from the terminal 64 update their terminal group address tables by adding the rank (number four), the MAC address, and the IP address of the terminal 64 to their terminal group address tables.

In the above-described data transmission method according to an embodiment of the present invention, although real-time data received from the server are reproduced by all of the terminals, the real-time data may also be reproduced by a single terminal having a rank lower than a rank of a predetermined terminal having an activated data transfer system, so that the predetermined terminal serves as a packet relay terminal for simply relaying packets received from the server.

Furthermore, after the ranks (status) of the data transfer systems of the terminals have been defined, a process of confirming (monitoring) an operating (activation) status of each other's data transfer systems may be conducted at predetermined intervals. Thereby, in a case where a terminal having an inoperable (inactive) data transfer system is found, the data of the terminal can be deleted from the terminal group address table of each terminal. By periodically conducting such maintenance of data of the original terminal and the destination terminal, reliability of this data transmission method can be enhanced.

With the above-described data transmission method and terminal according to an embodiment of the present invention, relatively large size data requested by a large number of terminals can be received and reproduced in real time by effectively using existing resources without increasing data traffic, to thereby increase the efficiency of the network.

Further, the present invention is not limited to these embodiments, but variations and modifications may be made without departing from the scope of the present invention.

What is claimed is:

1. A data transmission method for transmitting real-time data from a server to a plurality of terminals via a network having a plurality of local area networks connected to a wide area network, the method comprising the steps of:

grouping a plurality of terminals connected to a same switching hub into a single terminal group;

generating a table indicating a predetermined rank and an address of each terminal in the terminal group;

transmitting the real-time data from the server to a first terminal requesting transmission of the real-time data to the server, the first terminal having the highest rank according to the predetermined ranks indicated in the table at the time of requesting the transmission; and transferring the real-time data from the first terminal to a terminal that is one rank lower than the first terminal according to the predetermined ranks indicated in the table.

2. The data transmission method as claimed in claim 1, wherein the table is stored in a database of the server, wherein the table is generated in response to a request from each terminal.

3. The data transmission method as claimed in claim 1, wherein the table is stored in the switching hub, wherein the table is generated in response to a request from each terminal.

4. The data transmission method as claimed in claim 1, further comprising the step of:

transmitting a search packet from an active terminal to other terminals connected to the same switching hub as the active terminal;

wherein the table is generated based on a reply transmitted from the other terminals in response to the search packet.

5. A terminal used for a data transmission method for transmitting real-time data from a server to a plurality of terminals via a network having a plurality of local area networks connected to a wide area network, the terminal comprising:

a table indicating a predetermined rank and an address of each terminal of a single terminal group, the terminal group including a plurality of terminals connected to a same switching hub;

a reception part for receiving the real-time data from the switching hub or another terminal requesting transmission of the real-time data to the server, the another terminal being one rank higher than the terminal according to the predetermined ranks indicated in the table at the time of requesting the transmission; and a transfer part for transferring the real-time data to another terminal that is one rank lower than the terminal according to the predetermined ranks indicated in the table.

6. The terminal as claimed in claim 5, further comprising:

a reproduction part for reproducing the real-time data received in the reception part.

7. The terminal as claimed in claim 5, further comprising:

a search part for transmitting a search packet to other terminals connected to the same switching hub upon activation of the terminal;

a table registration part for, in a case where no reply is received from the other terminals in response to the search packet transmitted from the search part, registering the terminal as the highest rank in the table along with registering the address of the terminal, in a case where a reply is received from the other terminals in response to the search packet transmitted from the search part, registering the terminal as one rank lower than the lowest rank indicated in the table along with registering the address of the terminal and table data included in the reply from the other terminals; and a response/registration part for,
  in a case of receiving a search packet from one of the other terminals,
    generating a reply including data of the table,
    transmitting the generated reply in response to the search packet from the other terminal, and
    registering the other terminal as one rank lower than the lowest rank indicated in the table along with registering the address of the other terminal in the table.

* * * * *